US011272474B2

(12) United States Patent
Chae et al.

(10) Patent No.: US 11,272,474 B2
(45) Date of Patent: Mar. 8, 2022

(54) METHOD FOR TERMINAL RECEIVING SIDELINK SIGNAL IN WIRELESS COMMUNICATION SYSTEM SUPPORTING SIDELINK, AND DEVICE THEREFOR

(71) Applicant: LG ELECTRONICS INC., Seoul (KR)

(72) Inventors: Hyukjin Chae, Seoul (KR); Hanbyul Seo, Seoul (KR); Sukhyon Yoon, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 16/756,839

(22) PCT Filed: Oct. 29, 2018

(86) PCT No.: PCT/KR2018/012930
§ 371 (c)(1),
(2) Date: Apr. 16, 2020

(87) PCT Pub. No.: WO2019/083343
PCT Pub. Date: May 2, 2019

(65) Prior Publication Data
US 2020/0245281 A1 Jul. 30, 2020

Related U.S. Application Data

(60) Provisional application No. 62/577,746, filed on Oct. 27, 2017.

(51) Int. Cl.
*H04W 56/00* (2009.01)
*H04W 72/04* (2009.01)
(Continued)

(52) U.S. Cl.
CPC ........... *H04W 56/006* (2013.01); *H04L 5/00* (2013.01); *H04L 27/26* (2013.01);
(Continued)

(58) Field of Classification Search
CPC .......... H04W 56/006; H04W 72/0446; H04W 72/048; H04W 92/18; H04L 5/00; H04L 27/26
See application file for complete search history.

(56) References Cited

U.S. PATENT DOCUMENTS

2004/0106407 A1   6/2004   Kikuma et al.
2015/0334555 A1   11/2015  Seo et al.
(Continued)

FOREIGN PATENT DOCUMENTS

CN   106165524   11/2016
CN   106454710   2/2017
(Continued)

OTHER PUBLICATIONS

European Patent Office Application Serial No. 18870323.5, Search Report dated Jul. 13, 2021, 7 pages.
(Continued)

*Primary Examiner* — Nishant Divecha
(74) *Attorney, Agent, or Firm* — Lee, Hong, Degerman, Kang & Waimey PC

(57) ABSTRACT

Disclosed are a method for a terminal receiving a sidelink signal for each geographical area in a wireless communication system supporting a sidelink, and a device therefor according to various embodiments. Disclosed are a method for a terminal receiving a sidelink signal for each geographical area and a device therefor, the method comprising the steps of: receiving at least one synchronization signal transmitted for each geographical area; and configuring reception
(Continued)

timing for each geographical area on the basis of the at least one synchronization signal and receiving a sidelink signal.

13 Claims, 25 Drawing Sheets

(51) Int. Cl.
  *H04L 27/26* (2006.01)
  *H04L 5/00* (2006.01)
  *H04L 1/00* (2006.01)
  *H04W 92/18* (2009.01)

(52) U.S. Cl.
  CPC ..... *H04W 72/048* (2013.01); *H04W 72/0446* (2013.01); *H04W 92/18* (2013.01)

(56) References Cited

U.S. PATENT DOCUMENTS

| | | | |
|---|---|---|---|
| 2016/0044619 A1* | 2/2016 | Ryu | H04W 72/0446 370/350 |
| 2016/0095074 A1 | 3/2016 | Park et al. | |
| 2016/0227496 A1* | 8/2016 | Panteleev | H04W 36/0069 |
| 2016/0270012 A1* | 9/2016 | Chen | H04W 56/002 |
| 2017/0027013 A1* | 1/2017 | Kim | H04W 72/0413 |
| 2017/0285177 A1 | 10/2017 | Jin et al. | |

FOREIGN PATENT DOCUMENTS

| | | |
|---|---|---|
| CN | 107046461 | 8/2017 |
| EP | 3101927 | 12/2016 |
| WO | 2017123054 | 7/2017 |
| WO | 2017171908 | 10/2017 |
| WO | 2017171909 | 10/2017 |

OTHER PUBLICATIONS

PCT International Application No. PCT/KR2018/012930, International Search Report dated Jan. 25, 2019, 27 pages.

The State Intellectual Property Office of the People's Republic of China Application Serial No. 201880070104.6, Office Action dated Sep. 29, 2021, 8 pages.

* cited by examiner (a)

(b)

(a)

(b)

(a)

(b)

METHOD FOR TERMINAL RECEIVING SIDELINK SIGNAL IN WIRELESS COMMUNICATION SYSTEM SUPPORTING SIDELINK, AND DEVICE THEREFOR

CROSS-REFERENCE TO RELATED APPLICATIONS

This application is the National Stage filing under 35 U.S.C. 371 of International Application No. PCT/KR2018/012930, filed on Oct. 29, 2018, which claims the benefit of U.S. Provisional Application No. 62/577,746, filed on Oct. 27, 2017 the contents of which are all hereby incorporated by reference herein in their entirety.

TECHNICAL FIELD

The present disclosure relates to a wireless communication system supporting sidelink and, more particularly, to a method of receiving a sidelink signal for each geographic region by a user equipment and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DETAILED DESCRIPTION OF THE DISCLOSURE

Technical Problems

An object of the present disclosure is to configure a reception timing for each geographic region based on at least one synchronization signal transmitted in each geographic region and receive a sidelink signal even without a change in a cyclic prefix (CP) considering propagation delay by receiving the sidelink signal based on the reception timing configured for each geographic region.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of receiving a sidelink signal for each geographic region by a user equipment (UE) in a wireless communication system supporting sidelink, including receiving at least one synchronization signal transmitted in each geographic region; and receiving the sidelink signal by configuring a reception timing for the sidelink signal for each geographic region based on the at least one synchronization signal.

The reception timing may be determined based on a reception timing of the at least one synchronization signal associated with the geographic region in which the sidelink signal is transmitted.

The reception timing for the sidelink signal may be changed according to the geographic region in which the sidelink signal is transmitted.

The reception timing may be differently configured according to the geographic region.

The sidelink signal may be transmitted in time-divided resource regions according to the geographic region.

The synchronization signal may be transmitted on a preconfigured synchronization resource among the time-divided resource regions according to the geographic region.

Based on overlap of a partial region between the time-divided resource regions according to the geographic region, the UE may demodulate the received sidelink signal by puncturing a resource element or a symbol mapped to the overlapping partial region from the received sidelink signal.

Based on overlap of a partial region between the time-divided resource regions according to the geographic region, the sidelink signal may be transmitted by puncturing or rate-matching a resource element or a symbol corresponding to the partial region.

A size of the geographic region may be determined based on at least one of a cyclic prefix (CP) length, a subcarrier spacing, a carrier frequency, or coverage of the UE.

The number of geographic regions may be determined based on at least one of a cyclic prefix (CP) length, a subcarrier spacing, a carrier frequency, or coverage of the UE.

Information about the time-divided resource regions according to the geographic region may be signaled by a network to the UE through a physical layer or higher layer signal.

The method may further include determining a resource region related to geographic information for the UE among time-divided plural resource regions according to the geographic region, and transmitting the synchronization signal in the determined resource region.

Based on a change in a resource region related to the geographic information for the UE, the UE may transmit a new synchronization signal in the changed resource region.

The plural resource regions include a preconfigured time gap between the resource regions.

Advantageous Effects

The present disclosure may configure a reception timing for each geographic region based on at least one synchronization signal transmitted in each geographic region and receive a sidelink signal even without a cyclic prefix (CP) considering propagation delay by receiving the sidelink signal based on the reception timing configured for the geographic region, thereby minimizing overhead generated by increase in a CP length caused by the propagation delay.

Effects obtainable from the present disclosure are non-limited by the above-mentioned effects. And, other unmentioned effects can be clearly understood from the following description by those having ordinary skill in the technical field to which the present disclosure pertains.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE FOR CARRYING OUT THE DISCLOSURE

Figure 1:
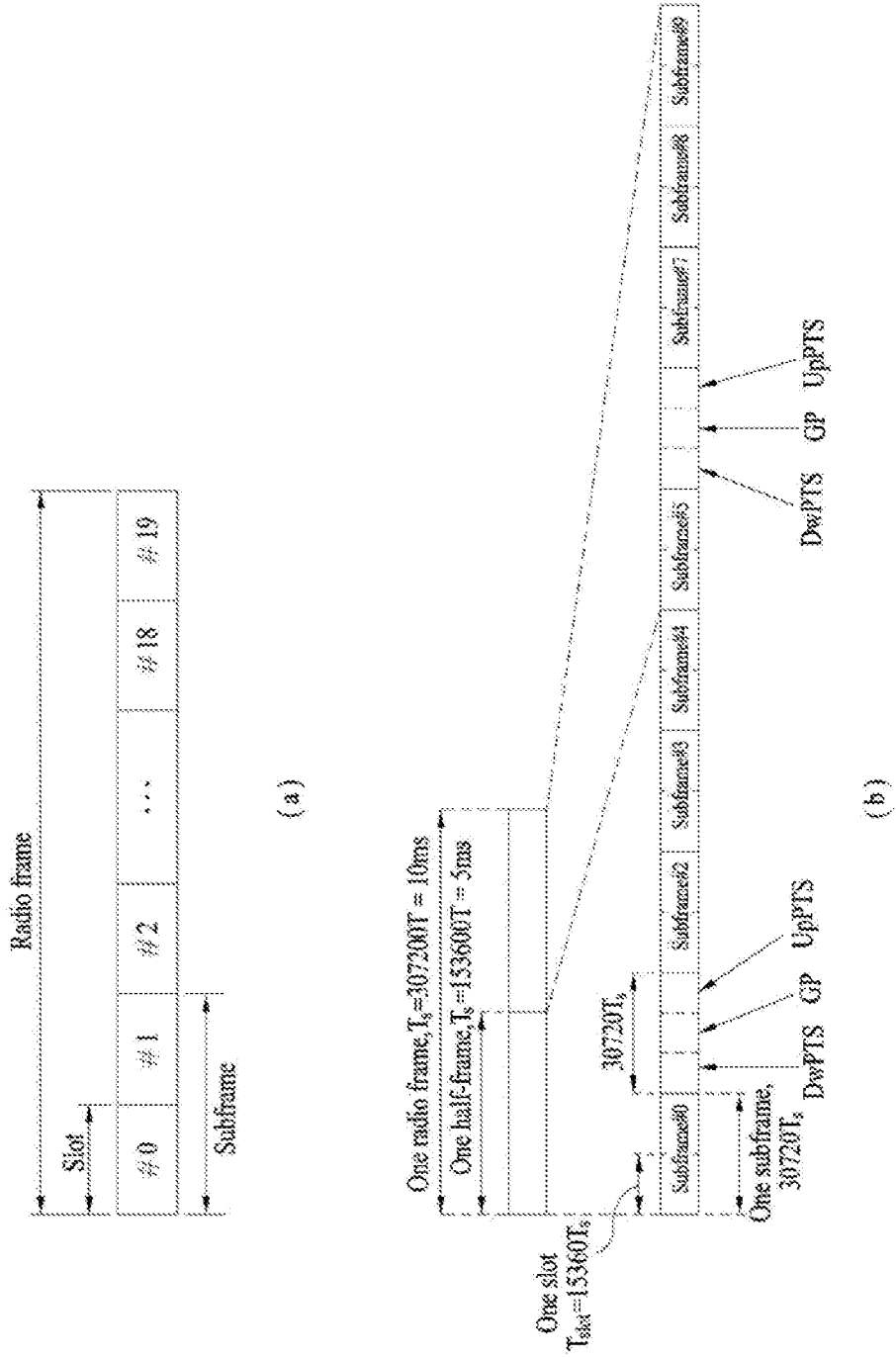
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
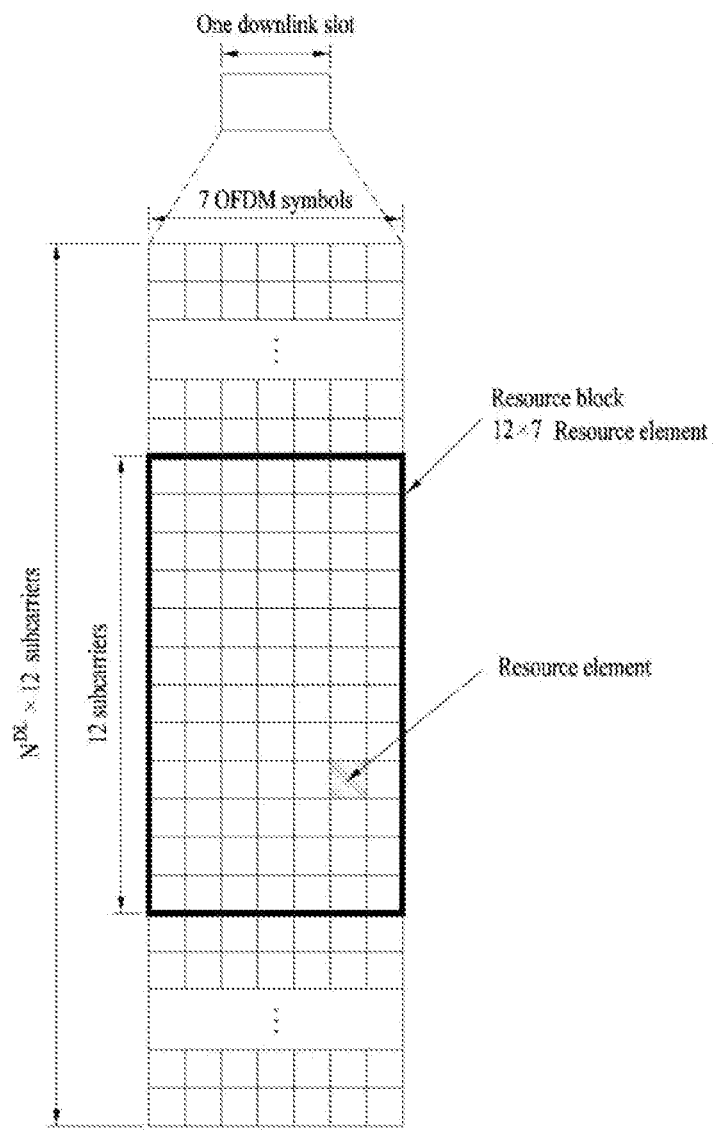
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
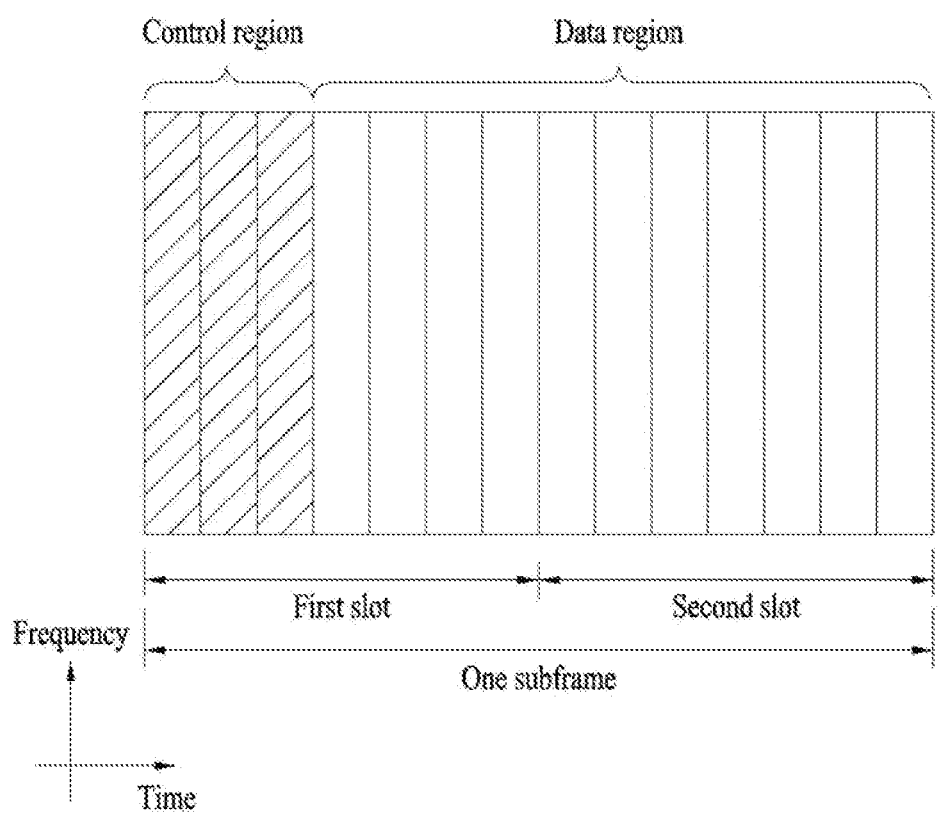
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
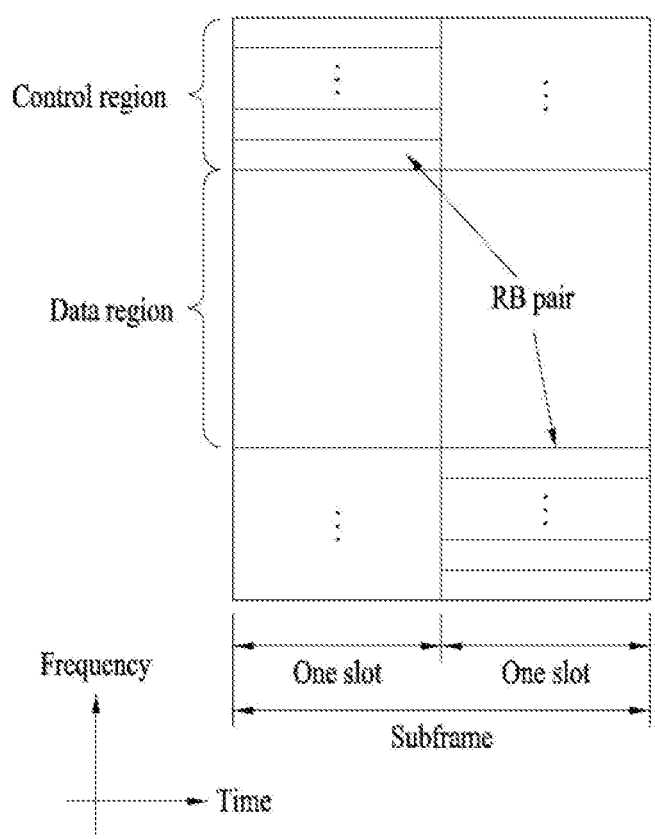
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
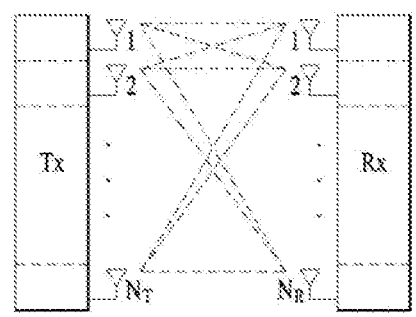
FIG. 5 is a view illustrating the configuration of a wireless communication system having multiple antennas.
Figure 5:
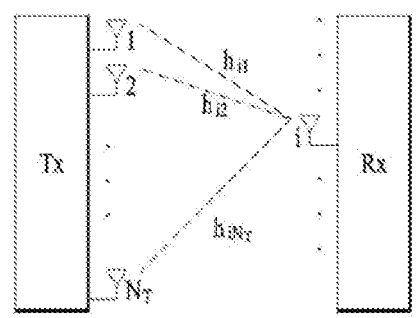

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s=[s_1,s_2,\ldots,s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to respectively, the transmission information with adjusted transmit powers can be represented as Equation 3.

$$\hat{s}=[\hat{s}_1,\hat{s}_2,\ldots,\hat{s}_{N_T}]^T=[P_1 s_1, P_2 s_2, \ldots, P_{N_T} s_{N_T}]^T \qquad \text{[Equation 3]}$$

In addition, can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_r 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y=[y_1,y_2,\ldots,y_{N_R}]^T \qquad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T=[h_{i1},h_{i2},\ldots,h_{iN_T}] \qquad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n=[n_1,n_2,\ldots,n_{N_R}]^T \qquad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \qquad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \qquad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
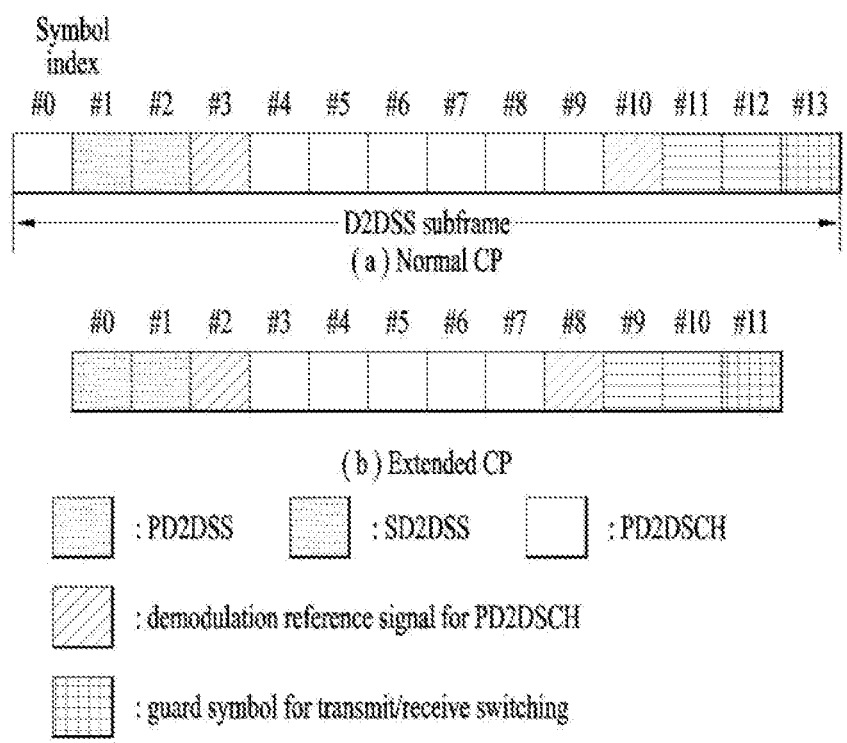
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DS S-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
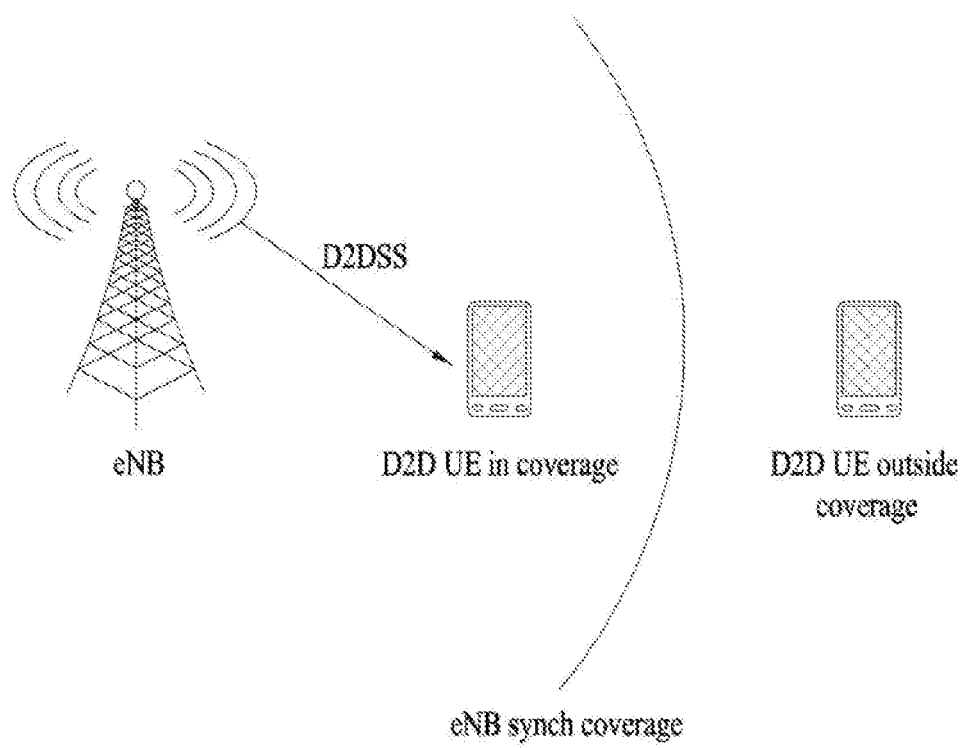
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
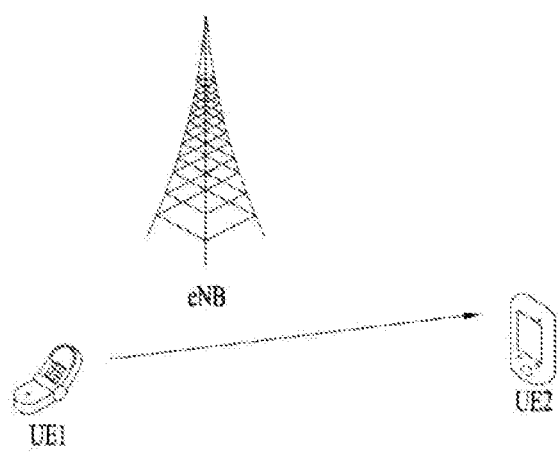
FIG. 8 is a view illustrating an exemplary D2D resource pool for D2D communication.
Figure 8:
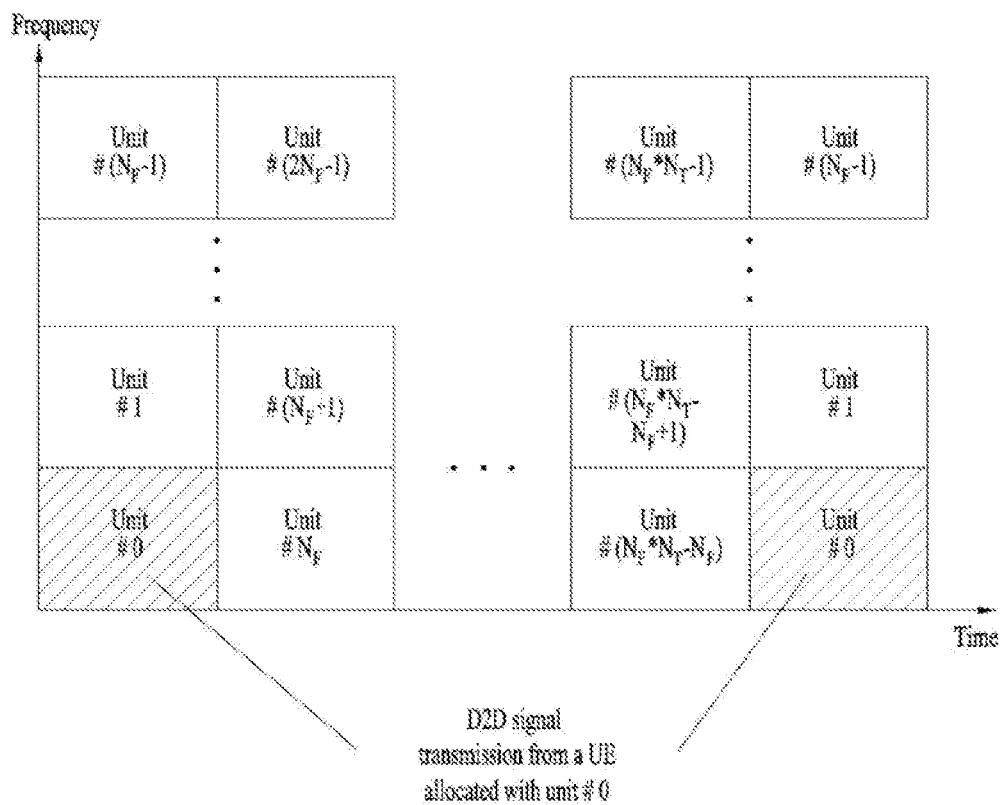

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 9:
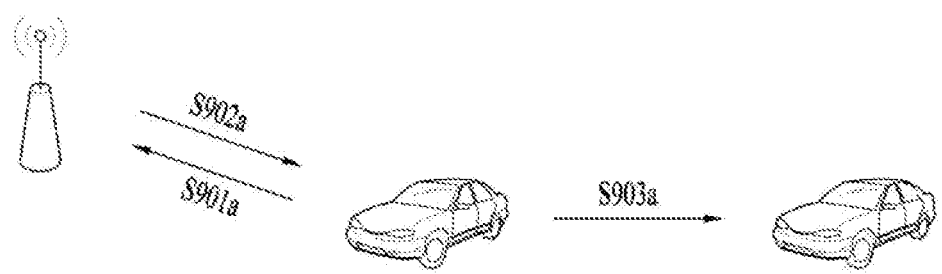
FIG. 9 is a view referred to for describing transmission modes and scheduling schemes for vehicle-to-everything (V2X)
Figure 9:
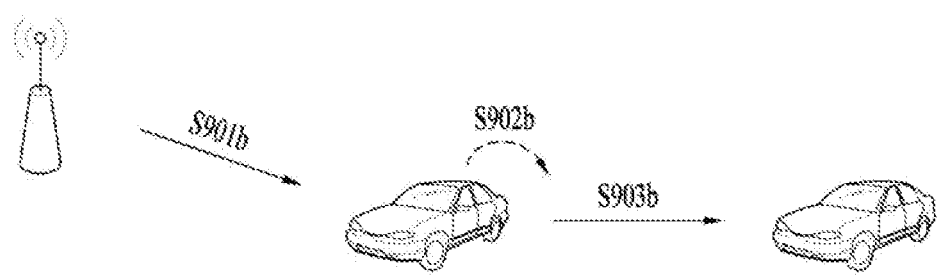
Figure 10:
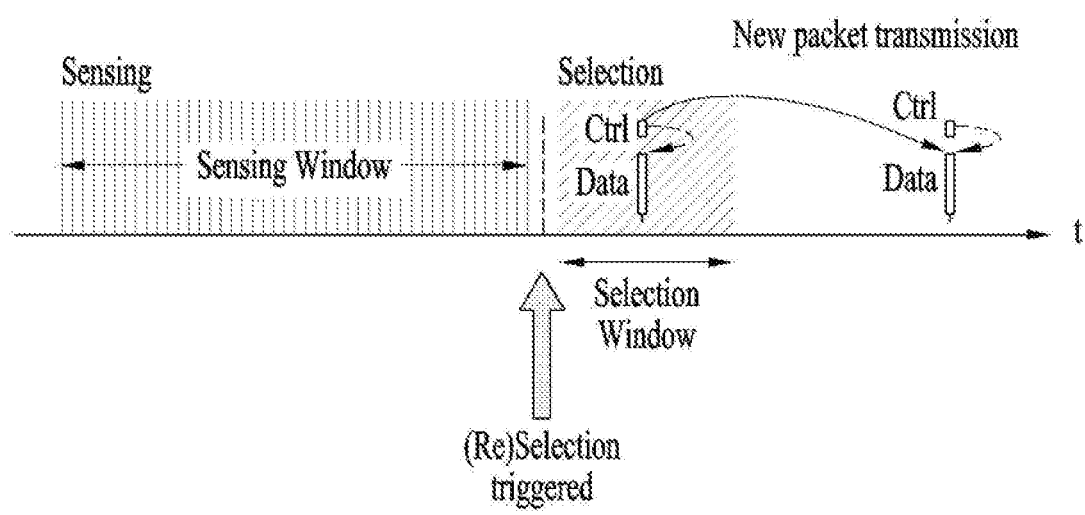
FIG. 10 is a view illustrating a method of selecting resources in V2X.
Figure 11:
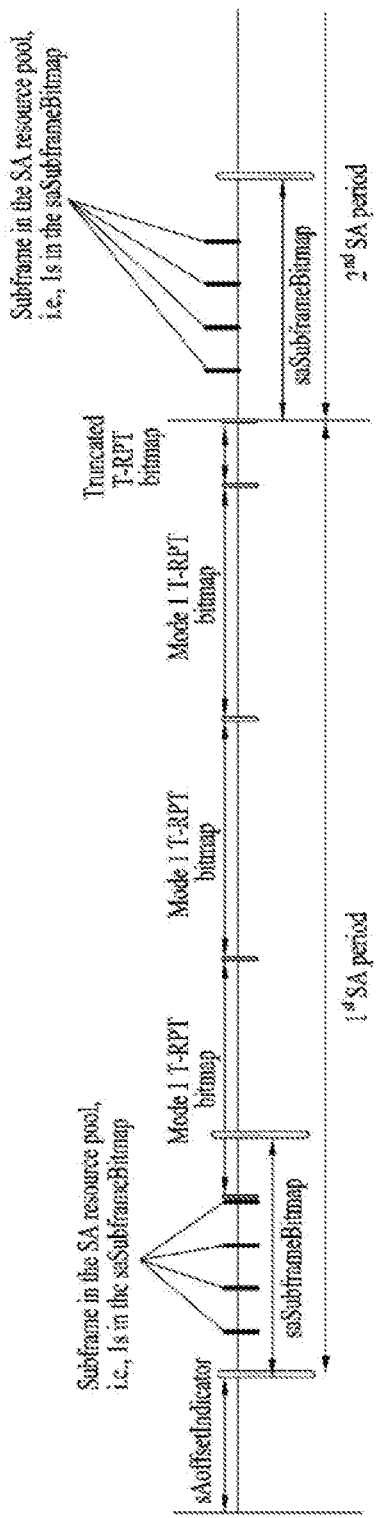
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901*a*), the eNB allocates the resources (S902*a*), and the vehicle transmits a signal in the resources to another vehicle (S903*a*). In the centralized transmission scheme, resources of another carrier may be also scheduled. In distributed scheduling corresponding to transmission mode 4 illustrated in FIG. 9(*b*), a vehicle selects transmission resources (S902*b*), while sensing resources preconfigured by the eNB, that is, a resource pool (S901*b*), and then transmits a signal in the selected resources to another vehicle (S903*b*). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Figure 12:
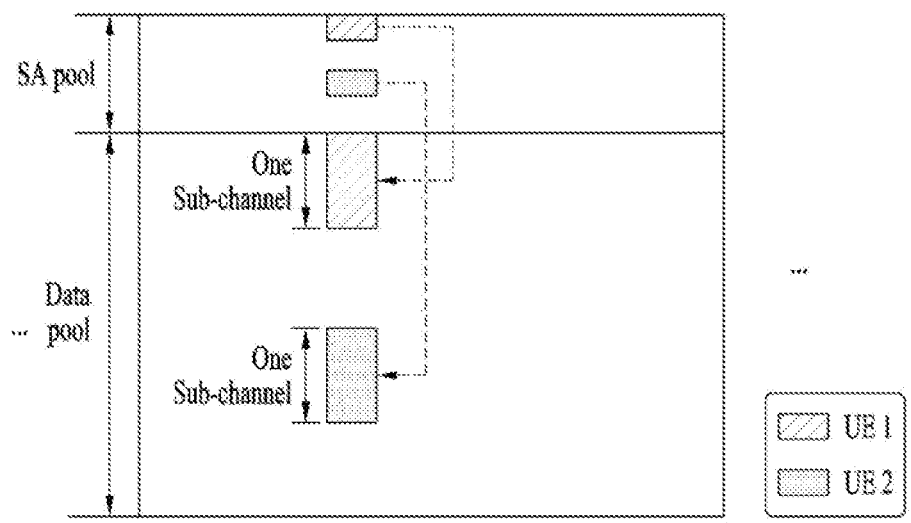
FIG. 12 is a view referred to for describing an SA and data transmission in V2X.
Figure 12:
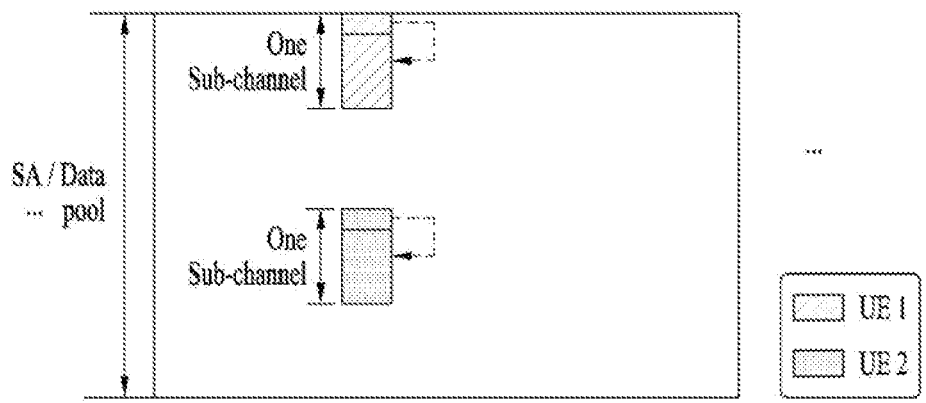

Unlike D2D, an SA (PSCCH) and data (PSSCH) are transmitted in FDM in V2X, that is, sidelink transmission mode 3 or 4. Because latency reduction is a significant factor in V2X in view of the nature of vehicle communication, an SA and data are transmitted in FDM in different frequency resources of the same time resources. Examples of this transmission scheme are illustrated in FIG. 12. An SA and data may not be contiguous to each other as illustrated in FIG. 12(*a*) or may be contiguous to each other as illustrated in FIG. 12(*b*). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

NR (New RAT (Radio Access Technology))

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
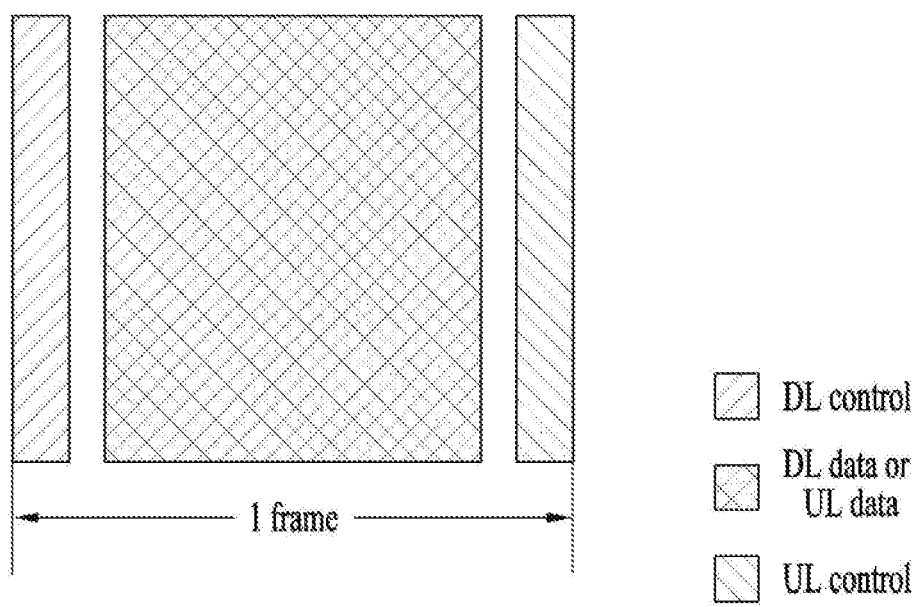
FIGS. 13 and 14 is a view illustrating a new radio access technology (NRAT) frame structure.
Figure 14:
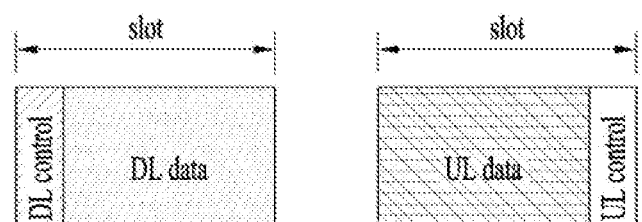
Figure 14:
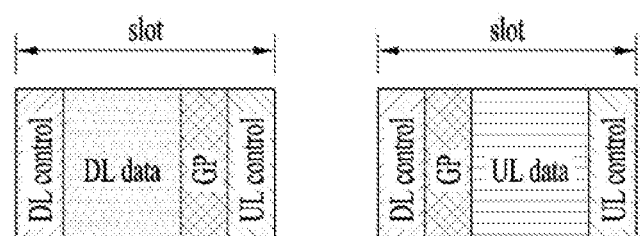

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like)

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP Rel. 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

Sidelink Synchronization and Resource Allocation in mmWave

The present disclosure relates to an operation for establishing synchronization between UEs in D2D communication. In new radio access technology (NR or new RAT), when a signal is transmitted and received in a wide band using millimeter wave (mmWave), a transmission rate of wireless UEs may dramatically increase. Since path attenuation of radio wave propagation increases at a higher frequency, use of radio communication according to mmWave has not been suitable for legacy radio communication due to high path attenuation of mmWave. However, as beamforming technology has been developed to compensate for path attenuation, the beamforming technology may be a core technology in mmWave.

As a carrier frequency increases, a subcarrier spacing may increase and thus the length of one OFDM symbol may be shortened. In order to keep CP overhead below a certain level, the length of a CP may also be shortened to match the length of the OFDM symbol. In addition, since delay spread is not large in the characteristics of a channel at a high frequency, even the shortened CP may cover all link-to-link delay spread.

When attempting to use mmWave (e.g., a high frequency band over 6 GHz) on sidelink (or D2D communication), the CP length may need to be configured in consideration of propagation delay as well as delay spread. For example, a CP (CP of a longer length) different from that used in a cellular link may be used in mmWave. More specifically, on sidelink, a rule may be determined to use a longer CP by configuring 12 symbols per subframe, rather than 14 symbols per subframe, and dividing the length of two symbols to equally allocate the CP per symbol. A rule may also be determined such that this operation may not be used in a carrier coexisting with Uu link (cellular link). In addition, a network (or BS) may signal to the UE which CP length is to be used on sidelink through a physical layer or higher layer signal.

Since overhead increases as the CP length increases, it may be inefficient to use the longer CP to absorb the above-described propagation delay through the CP. To solve this problem, a location-based resource region selection method is proposed. For example, according to the location-based resource region selection method, UEs at a specific location may be allowed to use similar time resources so that, from the perspective of a specific receiving UE, signals that are multiplexed in a specific time resource region may reach the specific receiving UE with similar propagation delays. To this end, the following operation is proposed.

Each UE may transmit a separate synchronization signal for each zone or zone group. In this case, the receiving UE may select an FFT window at an appropriate time by estimating a timing delay for signals having similar propagation delays. In this case, a transmission resource for the synchronization signal at each location may be indicated by the network to the UE through the physical layer or higher layer signal.

Currently, on Rel. 14 sidelink, the synchronization signal is transmitted only in center 6 resource blocks (RBs). In order to secure more synchronization resources, frequency-division multiplexed (FDMed) synchronization resources may be configured. That is, any RBs other than center RBs may be configured as a synchronization resource. For this purpose, not only a time offset of the synchronization signal but also a resource location at which the synchronization signal in the frequency domain is transmitted or a location at which the synchronization signal is expected to be transmitted in the frequency domain (sidelink synchronization signal frequency raster) should be configured by the network. Such a frequency location of the synchronization signal may be signaled to the UE by the network through the physical layer or higher layer signal or may be preconfigured for a UE outside coverage of the network. In this case, which synchronization resource will be used for each zone (or for each resource pool) may be signaled to the UE through the physical layer or higher layer signal.

Since the method of configuring the transmission resource of the synchronization signal for each zone (or geographic region) serves to effectively select the FFT window by the receiving UE, a UE that transmits a sidelink signal in an individual zone should transmit the signal based on a timing of a synchronization source selected thereby. For example, a UE that selects a global navigation satellite system (GNSS) as the synchronization source should transmit the signal at a GNSS timing based subframe boundary for signal transmission. However, when a signal of another UE is received, the subframe boundary (or slot boundary) is configured based on a reception timing of a synchronization signal associated with a zone of an individual UE.

Figure 15:
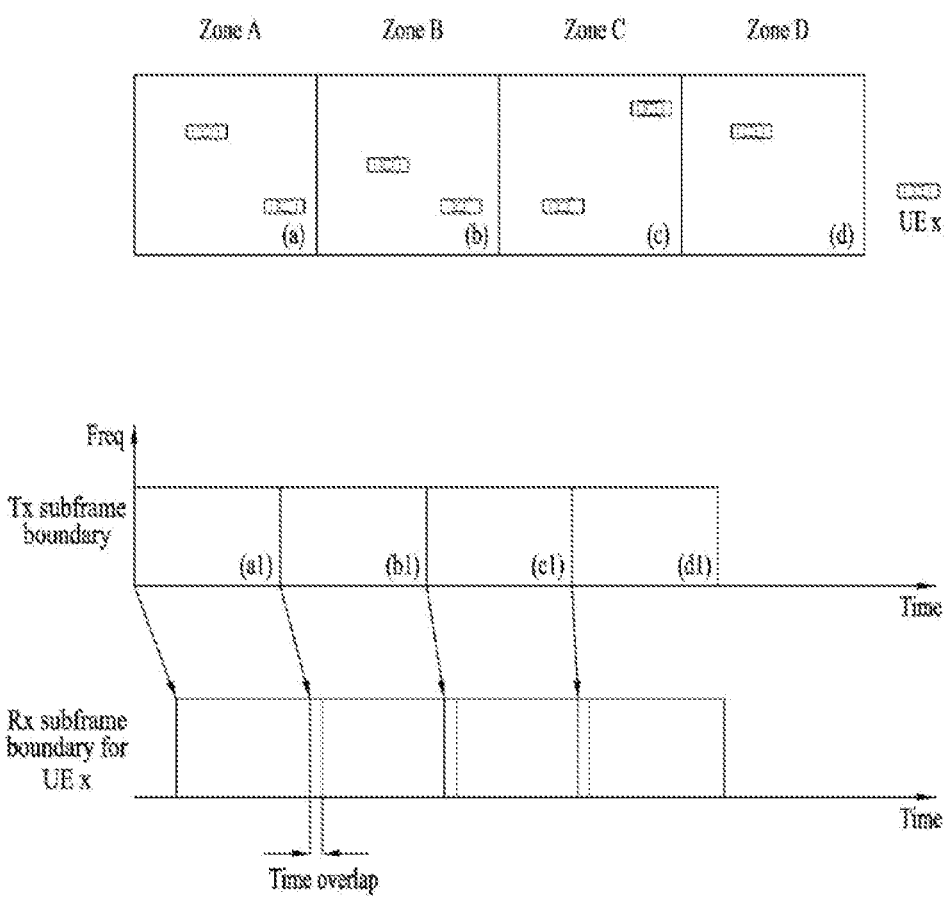
FIG. 15 is a view illustrating an example of a plurality of time-divided resource regions for each geographic region.

FIG. 15 illustrates an embodiment of the above-described method. Referring to FIG. 15, it is assumed that four zones are configured and a resource pool is time-division multiplexed (TDMed) in each zone. Each zone is configured with a separate synchronization resource and all or part of UEs transmit synchronization signals on the synchronization resource. From the perspective of a receiving UE x, since the respective zones have similar propagation delays, the receiving UE x may perform an FFT operation for each zone. In this case, since the degree of propagation delay of each zone differs, resources of the zones may partially overlap from the perspective of the receiving UE. In consideration of such an overlap problem, an additional time gap may be configured on resources of a boundary between zones (the last resource of a preceding zone or the starting resource of a following zone). The size of the time gap may be predetermined or may be indicated to the UE by the network through the physical layer or higher layer signal. This time gap may be separately configured only on the resources of the boundary between zones or may be configured in every subframe (or slot). In addition, in order to prevent transmission signals from overlapping in an overlapping region of a resource region as described above, a transmitting UE may rate-match or puncture REs or symbols mapped to the overlapping region. Alternatively, whether to perform rate matching may be predetermined or may be signaled by the network through the physical layer or higher layer signal. If the gap for transmission/reception (Tx/Rx) switching is large enough to absorb all propagation delays between zones, an additional time gap may not be necessary.

In addition, in a subframe (or slot) between zones, not only the time gap, but also an additional cyclic suffix (CS) used in the last symbol of a preceding zone and/or an additional extended CP used in the first symbol of a following zone may be configured. Alternatively, the last region of the preceding zone may be punctured or rate-matched and a preamble (or patterned data) or a synchronization signal may be transmitted in the first symbol of every zone or every subframe.

Alternatively, such a time gap may be transmitted by a transmitter without an additional operation and may be demodulated by a receiver by puncturing an overlapping region. In this case, the overlapping region may be identified through the implementation of the receiving UE or the network may signal the size of a maximally overlapping region or the overlapping region at the boundary between zones to the UE through the physical layer or higher layer signal.

It has been assumed in the above embodiment that the TDMed resource region is configured in each zone. If the resource region for each zone is FDMed, a guard RB or a guard subframe may be configured between frequency resource regions of zones. If the guard RB or the guard subcarrier is configured, rate matching or puncturing may be performed in a corresponding RE/RB. The guard RB or the guard subcarrier may be configured for each RB or RB group or may be configured only at a boundary of a resource pool in each zone. In addition, transmission power of an RE may be boosted in proportion to the number of null carriers used for the guard subcarrier. In addition, when the resource region is FDMed in each zone, a rule may be determined such that the UE performs FFT by the number of maximally FDMed zones in one subframe.

Figure 16:
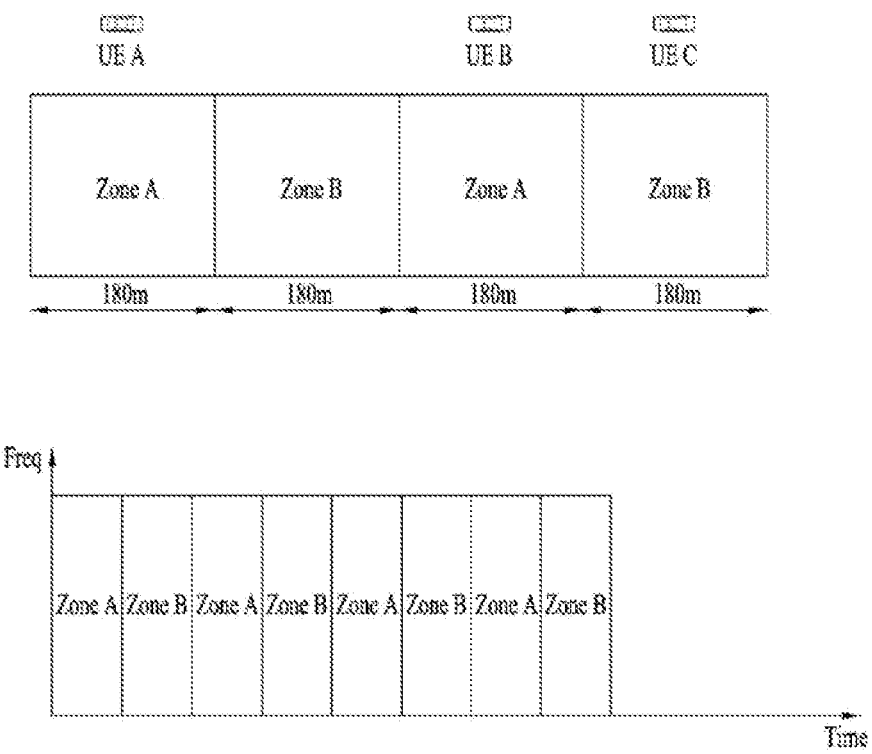
FIG. 16 is a view illustrating another example of a plurality of time-divided resource regions for each geographic region.

Referring to FIG. 16, restrictions on the size of a zone may be configured and restrictions on a minimum distance with which the same zone is repeated may be configured. Alternatively, restrictions on the minimum number of zones may be configured. These parameters may be differently configured according to CP length or may be differently configured for each carrier frequency. When a subcarrier spacing is 120 kHz, if a CP is about 0.6 μs (assuming that there is no timing error and delay spread is very short), the size of the zone (or geographic region) is about 180 meters. For example, UEs within 180 meters may be subjected to FDM. In this case, a separate synchronization signal may be transmitted so that a UE far away may correctly select an FFT window. For example, if two zones are configured, 180-meter zones A and B (or, geographic regions A and B) may be alternately present.

In this case, zones should be configured such that the same zone (or geographic region) does not appear in target V2X coverage (for example, 10 zones are required if the target V2X coverage is 1800 m). Referring to FIG. 16, when UEs A and B use the same zone, a signal that reaches UE C exceeds a CP length due to propagation delay. That is, the size and number of required zones (or geographic regions) are determined based on a CP length, a subcarrier spacing, a carrier frequency, and V2X service coverage, and the number of synchronization resources is also determined according thereto. The UE may signal, to the network, up to which coverage (with which service) support should be provided, through the physical or higher layer signal. The network may configure the size and number of zones based on this information.

While, according to the above description, a separate synchronization signal has been defined, this is for convenience of description and the synchronization signal may be a preamble. Importantly, a predetermined signal for adjusting a timing at the receiver may be transmitted in each zone.

The contents of the present disclosure are not limited only to D2D communication and may be used on uplink (UL) or downlink (DL). In this case, the BS or the relay node may use the proposed method. Since examples of the above-described proposed methods may be included in one of implementation methods, it is obvious that the examples may be regarded as proposed methods. Although the above-described proposed methods may be independently implemented, the proposed methods may be implemented in a combined (incorporated) form of parts of the proposed methods. A rule may be defined such that information as to whether the proposed methods are applied (or information about rules of the proposed methods) is indicated by the BS to the UE or by the transmitting UE to the receiving UE through a predefined signal (e.g., a physical layer signal or a higher-layer signal).

Figure 17:
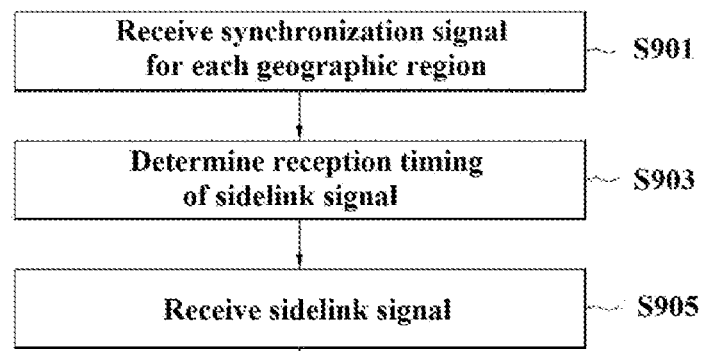
FIG. 17 is a flowchart for explaining a method for a UE to receive a sidelink signal for each geographic region according to an embodiment of the present disclosure.

FIG. 17 is a diagram for explaining a method for a UE to receive a sidelink signal for each geographic region according to an embodiment of the present disclosure.

Referring to FIG. 17, the UE may receive at least one synchronization signal transmitted in each geographic region. In other words, the synchronization signal may be individually transmitted in each geographic region. For example, when a plurality of geographic regions categorized as a first geographic region to a tenth geographic region is configured for the UE, the UE may receive a plurality of synchronization signals transmitted in the first to tenth geographic regions. That is, the UE may distinguishably receive the synchronization signals transmitted in the first to tenth geographic regions. The size and number of the geographic regions may be preconfigured by the network (or BS) based on the coverage of the UE and a CP length. The UE may receive information about the geographic regions including the preconfigured size and number of the geographic regions from the network.

Next, after receiving at least one synchronization signal transmitted in each geographic region (or a plurality of synchronization signals transmitted in a plurality of geographic regions), the UE may configure or determine a reception timing of a sidelink signal for each geographic region based on the at least one synchronization signal. That is, the UE may configure or determine a reception timing corresponding to each geographic region. For example, when the plural geographic regions include first to fifth geographic regions, the UE may configure or determine reception timings for the first to fifth geographic regions based on synchronization signals transmitted in the first to fifth geographic regions.

That is, the UE may predetermine the reception timing of the sidelink signal for each geographic region. In this case, when receiving a plurality of sidelink signals transmitted in one specific geographic region, the UE may receive the plural sidelink signals with similar propagation delays.

When receiving the sidelink signal, the UE may configure and determine the reception timing of the sidelink signal based on a synchronization signal associated with a geographic region in which the sidelink signal is transmitted. For example, when the sidelink signal is transmitted in a third geographic region, the UE may determine the reception timing of the sidelink signal based on a reception timing of a synchronization signal transmitted in the third geographic region.

In addition, when receiving the plurality of sidelink signals, the UE may change a reception timing according to a geographic region in which each of the plural sidelink signals is transmitted. That is, the UE may be configured with different reception timings according to geographic regions in which the sidelink signals are transmitted. For example, when the UE receives a first synchronization signal transmitted in a first geographic region and a second synchronization signal transmitted in a second geographic region, the UE may determine a reception timing of a sidelink signal for the first geographic region based on the first synchronization signal and determine a reception timing of a sidelink signal for the second geographic region based on the second synchronization signal. In this case, upon receiving the sidelink signal transmitted in the first geographic region, the UE may receive the sidelink signal at a first link timing and, upon receiving the sidelink signal transmitted in the second geographic region, the UE may receive the sidelink signal at a second link timing Alternatively, the sidelink signal and the synchronization signal may be transmitted in a time-divided resource region in each geographic region. In this case, the sidelink signal may be transmitted at a similar timing in each geographic region. The UE may efficiently distinguish between sidelink signals transmitted in the respective geographic regions. In addition, the sidelink signals may be preconfigured in the resource regions time-divided in each geographic region on transmission resources on which the synchronization signal is transmitted.

Even if the sidelink signal and the synchronization signal are transmitted in a time-divided resource region in each geographic region, an overlapping resource region may occur between any one resource region and a resource region adjacent thereto from the perspective of the receiving UE. The overlapping resource region may occur according to difference in the degree of propagation delay caused by a difference in distance between geographical regions. For example, even when the resource region is time-divided in each geographic region, the overlapping resource region may occur at a boundary between the resource region and a resource region adjacent thereto according to difference in the degree of propagation delay.

In consideration of this point, time-divided resource regions in each geographic region may include an additional time gap between resource regions adjacent to each other. The time gap may be preconfigured by the network in consideration of a maximum size of a difference in propagation delay estimated based on the size and number of the geographical regions. That is, the time-divided resource regions in each geographic region may include the additional time gap in a boundary portion between the resource regions.

Alternatively, in consideration of the maximum size of the difference in propagation delay from the perspective of the receiving UE, the UE may demodulate the sidelink signal by puncturing an RE or a symbol mapped to the overlapping resource region from the received sidelink signal.

Alternatively, in consideration of the maximum size of the difference in the propagation delay from the viewpoint of the transmitting UE, the UE may transmit the sidelink signal by rate-matching or puncturing the RE or symbol mapped to the overlapping resource region.

Alternatively, the resource region configured in each geographic region may be FDMed in the frequency domain. In this case, a specific guard subcarrier or a guard RB may be included between geographic regions.

Next, the UE may receive a sidelink signal while changing a reception timing of the sidelink signal transmitted in each geographic region based on the reception timing determined for each geographic region. For example, when receiving a sidelink signal transmitted in a first geographic region, the UE may receive the sidelink signal transmitted in the first geographic region at a first reception timing. Upon receiving a sidelink transmitted in a second geographic region, the UE may receive the sidelink signal transmitted in the second geographic region by switching from the first reception timing to the second reception timing. That is, a separate synchronization signal is transmitted in each geographic region and the UE may differently configure a reception timing for each geographic region based on the separate synchronization signal for each geographic region. Therefore, the network (or BS) or the transmitting UE may perform effective sidelink signal transmission even without increasing a CP length by considering propagation delay according to the difference in the geographic region. In addition, even if a previous CP length is maintained, the UE may effectively receive a plurality of sidelink signals transmitted in multiple geographic regions in which an influence of interference caused by propagation delay is minimized.

The UE may pre-receive the information about the geographic regions from the network or the transmitting UE.

Specifically, the information about the geographic regions may include information about the size of the geographic regions or the number of the geographic regions. The network (or BS) may determine the size of the geographic regions or the number of the geographic regions so that a time delay caused by a propagation delay has a range not exceeding an existing CP length even when a sidelink signal based on the existing CP length is transmitted. For example, the network may preconfigure the number and size of the geographical regions in consideration of at least one of the coverage of a service that the UE provides or the UE desires to receive, a preconfigured CP length, a subcarrier spacing, or a carrier frequency.

The UE may transmit the at least one synchronization signal to another UE while receiving the sidelink signal and a related description thereof will be given hereinbelow.

Figure 18:
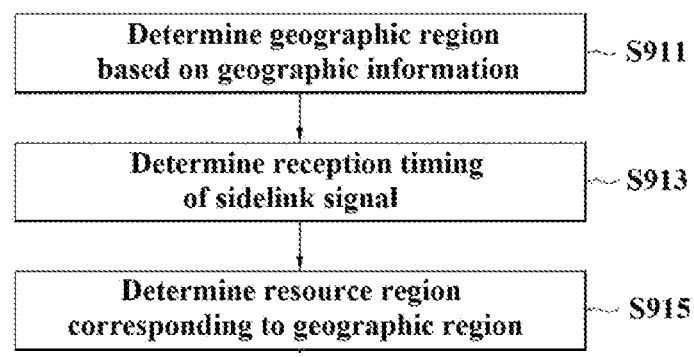
FIG. 18 is a flowchart for explaining a method for a UE to transmit a sidelink signal for each geographic region according to an embodiment of the present disclosure.

FIG. 18 is a diagram for explaining a method for a UE to transmit a sidelink signal for each geographic region according to an embodiment of the present disclosure.

Referring to FIG. 18, the UE may determine a geographic region related to geographic information among a plurality of preconfigured geographic regions based on the geographic information thereof. The plural preconfigured geographic regions may be preconfigured by the network (or BS) as described with reference to FIG. 17. Here, the geographic information may be determined based on coordinate information of the UE measured using a global positioning system (GPS) or GNSS included in the UE.

Next, the UE may determine a resource region corresponding to the determined geographic region. Here, the determined resource region is a resource region corresponding to the determined geographic region among a plurality of previously time-divided resource regions in each geographic region. The resource region may be previously FDMed in each geographic region in the frequency domain. The plural geographic regions may include an additional time gap between resource regions. As described above with reference to FIG. 17, overlap of a resource region due to propagation delay may be prevented through the additional time gap from the perspective of the UE receiving a sidelink signal. Alternatively, as described above with reference to FIG. 17, the UE may transmit the sidelink signal or the synchronization signal by puncturing or rate-matching a symbol or an RE corresponding to the overlap without adding the time gap.

Next, the UE may transmit the synchronization signal in the determined resource region. In the resource region, a transmission resource on which the synchronization signal is transmitted may be preconfigured. In this case, the UE may transmit the synchronization signal on the preconfigured transmission resource. Here, the transmission resource on which the synchronization signal is transmitted may be configured as RBs other than the existing center 6 RBs. The network may preconfigure the transmission resource on which the synchronization signal is transmitted and provide information thereabout to the UE.

The UE may be included in a vehicle or the like and transmit a new synchronization signal when the geographic region is changed due to movement. Specifically, when a previous geographic region is changed to another geographic region due to location change of the UE, the UE may redetermine a resource region corresponding to the changed geographic region and transmit a new synchronization signal in the redetermined resource region. That is, the UE may transmit the synchronization signal again in the resource region corresponding to the changed geographic region when there is a change in the preconfigured geographic region.

The UE may differently configure a reference timing upon transmitting the sidelink signal and a reference timing upon receiving the sidelink signal. The UE may transmit the sidelink signal based on a resource region determined based on the geographic information thereof. That is, the UE may configure a transmission timing of the sidelink signal based on a timing of the synchronization signal transmitted in the determined resource region. Alternatively, when receiving the sidelink signal, the UE does not consider the configured transmission timing of the sidelink signal. In this case, the UE may be based on a reception timing of a synchronization signal associated with the geographic region in which the sidelink signal (received sidelink signal) is transmitted without considering the transmission timing. The UE may configure a reception timing of the sidelink signal based on the reception timing of the associated synchronization signal, thereby receiving the sidelink signal based on the reception timing. A detailed method of configuring the reception timing is as described with reference to FIG. 17.

Figure 19:
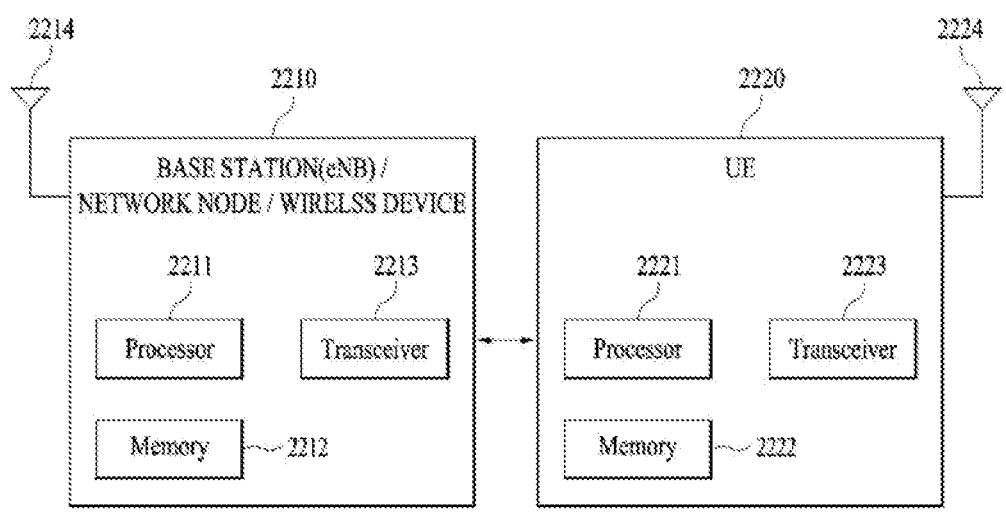
FIG. 19 is a block diagram of an example of wireless communication devices according to some implementations of the present disclosure.

FIG. 19 is a block diagram of wireless communication devices according to an embodiment of the present disclosure.

Referring to FIG. 19, a wireless communication system may include a BS 2210 and a UE 2220. The UE 2220 may be located within the coverage of the BS. In some embodiments, the wireless communication system may include a plurality of UEs. Referring to FIG. 19, although the BS 2210 and the UE 2220 are illustrated, the present disclosure is not limited thereto. For example, the BS 2210 may be replaced with a network node, a UE, a wireless device, or the like. Alternatively, each of the BS and the UE may be represented as a wireless communication device or a wireless device.

The UE 2220 may include at least one processor 2221, at least one memory 2222, and at least one transceiver 2223. The processor 2211 may perform necessary processing in each embodiment in order to implement functions, procedures, or methods described in the above-described embodiments. One or more protocols may be implemented by the processor 2221. For example, the processor 2221 may implement one or more layers (e.g., functional layers) of a radio interface protocol. The memory 2222 is connected to the processor 2221 and stores various types of information and/or instructions. The transceiver 2223 is electrically connected to the processor 2221 and may be controlled by the processor 2221 to transmit and/or receive radio signals.

Specifically, in a method of receiving a sidelink signal for each geographic region by the UE, the processor 2221 may control the transceiver 2223 to receive at least one synchronization signal transmitted in each geographic region. The processor 2221 may control the memory 2222 to store the at least one synchronization signal therein, configure a reception timing for each geographic region based on the at least one synchronization signal stored in the memory 2222, and control the transceiver 2223 to receive the sidelink signal based on the reception timing configured for each geographic region.

Alternatively, the processor 2221 may determine the reception timing of the sidelink based on a reception timing of the at least one synchronization signal associated with the geographical region in which the sidelink signal is transmitted. Alternatively, the processor 2221 may change the reception timing for the sidelink signal according to the geographic region in which the sidelink signal is transmitted. Alternatively, the processor 2221 may differently configure the reception timing of the sidelink signal in the geographical region based on the at least one synchronization signal. Alternatively, the processor 2221 may control the transceiver 2223 to receive the sidelink signal transmitted in a time-divided resource region according to the geographic region. Alternatively, when a partial region between time-divided resource regions in the geographic region overlaps, the processor 2221 may demodulate the received sidelink signal by puncturing an RE or a symbol mapped to the overlapping partial region from the received sidelink signal.

Alternatively, when the partial region between the time-divided resource regions in the geographic region overlaps, the processor 2221 may control the transceiver 2223 to receive the sidelink signal transmitted by puncturing or rate-matching an RE or a symbol corresponding to the partial region. Alternatively, the processor 2221 may control the transceiver 2223 to receive information about the time-divided resource regions in the geographic region transmitted by the network through a physical layer or higher layer signal.

In addition, the processor 2221 may determine a resource region related to geographic information for the UE among a plurality of time-divided resource regions for each geographic region, prestored in the memory 2222. In this case, the processor 2221 may control the transceiver 2223 to transmit the synchronization signal in the determined resource region. When the resource region related to the geographical information for the UE is changed, the processor 2221 may determine a resource region for the changed resource region and control the transceiver 2223 to transmit a new synchronization signal in the determined resource region. In this case, the plural resource regions may include a preset time gap therebetween.

The BS 2210 may include at least one processor 2211, at least one memory 2212, and at least one transceiver 2213. The processor 2211 may perform necessary processing in each embodiment in order to implement functions, procedures, or methods described in the above-described embodiments.

Specifically, the processor 2211 may generate a signal to control the UE to transmit at least one synchronization signal for each geographic region. The processor 2211 may also generate a signal to control the UE to configure a reception timing for each geographic region based on the at least one synchronization signal. The processor 2211 may configure time-divided resource regions according to the geographic region. The processor 2211 may preconfigure a synchronization resource on which the synchronization signal is transmitted among the time-divided resource regions according to the geographic region. The processor 2211 may determine the size of the geographic region for the UE based on a CP length, a subcarrier spacing, a carrier frequency, and the coverage of the UE. The processor 2211 may determine the number of geographic regions for the UE based on the CP length, the subcarrier spacing, the carrier frequency, and the coverage of the UE. In this case, the processor 2211 may control the transceiver 2213 to signal information about the time-divided resource regions according to the geographic region to the UE through the physical layer or higher layer signal. The processor 2211 may configure the plural resource regions that include a preset time gap therebetween and are time-divided for each geographic region.

One or more protocols may be implemented by the processor 2211. For example, the processor 2211 may implement one or more layers (e.g., functional layers) of a radio interface protocol. The memory 2212 is connected to the processor 2211 and stores various types of information and/or instructions. The transceiver 2213 is electrically connected to the processor 2211 and may be controlled by the processor 2211 to transmit and/or receive radio signals.

The memories 2212 and/or 2222 may be disposed inside or outside the processors 2211 and/or 2221, respectively, and may be connected to the processor using various technologies such as wired or wireless connections.

The BS 2210 and/or the UE 2220 may have a single antenna or multiple antennas. For example, antennas 2214 and/or 2224 may be configured to transmit and receive radio signals.

Figure 20:
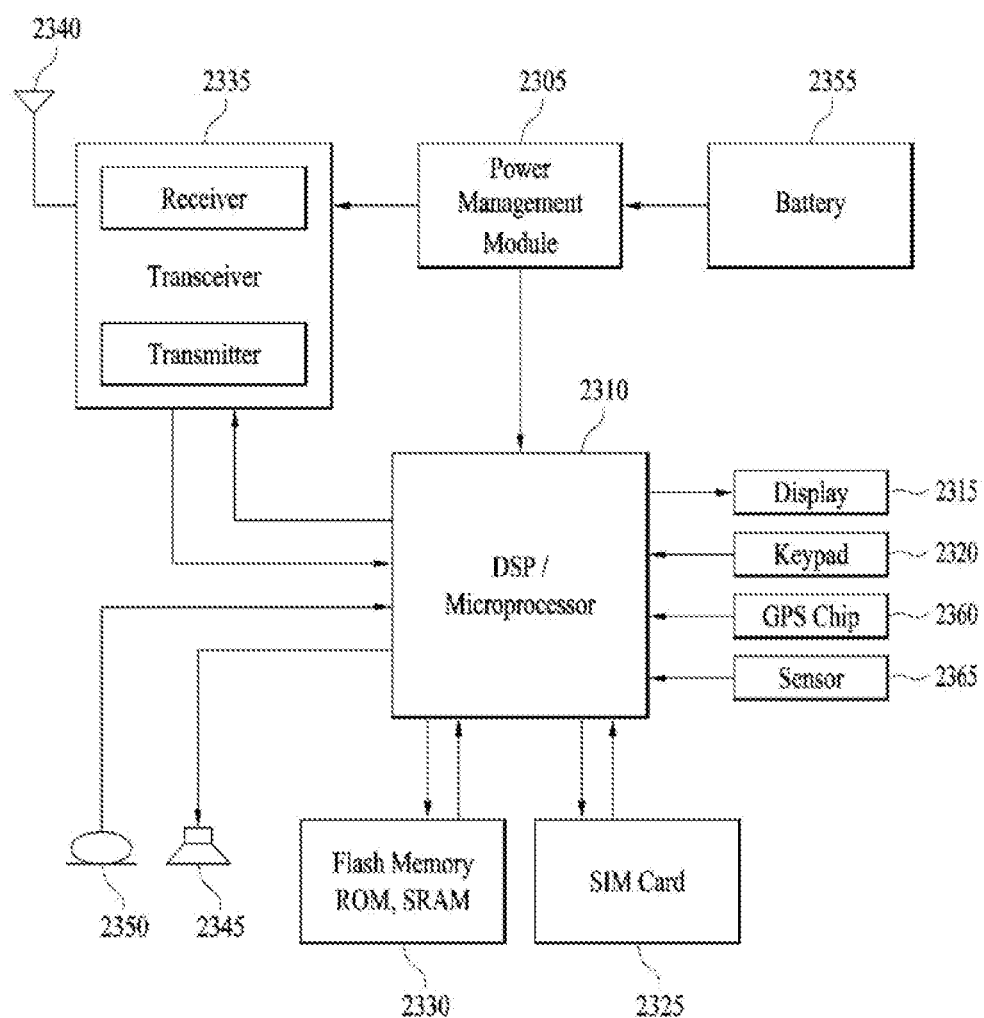
FIG. 20 shows one example of an implementation of a wireless communication device according to some implementations of the present disclosure.

FIG. 20 shows one example of an implementation of a wireless communication device according to an implementation of the present disclosure.

Particularly, FIG. 20 is a diagram illustrating an example of the UE 2220 shown in FIG. 19 in more detail. However, the wireless communication device in FIG. 20 is not limited to the UE 2220, and the wireless communication device may be any suitable mobile computing device that is configured to implement one or more implementations of the present disclosure, such as a vehicular communication system or device, a wearable device, a laptop, a smartphone, and so on.

Referring to the example of FIG. 20, the UE 2220 includes at least one processor (e.g., digital signal processor: DSP, or Microprocessor) such as a processor 2310, a transceiver 2335, a power management module 2305, an antenna 2340, a battery 2355, a display 2315, a keypad 2320, a Global Positioning System (GPS) chip 2360, a sensor 2365, a memory 2330, a Subscriber Identification Module (SIM) card 2325 (which may be optional), a speaker 2345 and a microphone 2350. The UE 2220 may include a single antenna or multiple antennas.

The processor 2310 may be configured to implement the functions, procedures and/or methods described in FIGS. 1 to 21 of the present disclosure. In some implementations, the processor 2310 may implement one or more protocols, such as layers (e.g., functional layers) of a wireless interface protocol.

The memory 2330 is connected to the processor 2310 and stores information related to operations of the processor 2310. The memory 2330 may be located inside or outside the processor 2310 and may be connected to the processors through various techniques, such as wired or wireless connections.

A user may enter various types of information (e.g., instructional information such as a telephone number), by various techniques, such as by pushing buttons of the keypad 2320 or by voice activation using the microphone 2350. The processor 2310 receives and processes the user's information and performs the appropriate function(s), such as dialing the telephone number. In some scenarios, data (e.g., operational data) may be retrieved from the SIM card 2325 or the memory 2330 to perform the function(s). In some scenarios, the processor 2310 may receive and process GPS information from a GPS chip 2360 to perform functions related to a position or a location of a UE, such as vehicle navigation, a map service, and so on. In some scenarios, the processor 2310 may display these various types of information and data on the display 2315 for the user's reference and convenience.

The transceiver 2335 is connected to the processor 2310, transmits and/or receives a wireless signal, such as an RF (Radio Frequency) signal. The processor 2310 may control the transceiver 2335 to initiate communication and to transmit radio signals including various types of information or data, such as voice communication data. The transceiver 2335 includes a receiver and a transmitter to receive and transmit radio signals. An antenna 2340 facilitates the transmission and reception of radio signals. In some implementations, upon receiving radio signals, the transceiver 2335 may forward and convert the signals to baseband frequency for processing by the processor 2310. The processed signals may be processed according to various techniques, such as being transformed into audible or readable information to be output via the speaker 2345.

In some implementations, a sensor 2365 may be coupled to the processor 2310. The sensor 2365 may include one or more sensing devices configured to detect various types of information including, but not limited to, speed, acceleration, light, vibration, proximity, location, image and so on. The processor 2310 may receive and process sensor information obtained from the sensor 2365 and perform various types of functions, such as a collision avoidance, autonomous driving and so on.

In the example of FIG. 20, various components (e.g., a camera, a Universal Serial Bus (USB) port, etc.) may be further included in the UE. For example, a camera may be further coupled to the processor 2310 and may be used for various services such as autonomous driving, a vehicle safety service and so on. As such, FIG. 20 is an example of a UE, and implementations are not limited thereto. For example, some components, e.g., a keypad 2320, a Global Positioning System (GPS) chip 2360, a sensor 2365, a speaker 2345 and/or a microphone 2350, may not be implemented in a UE in some scenarios.

Figure 21:
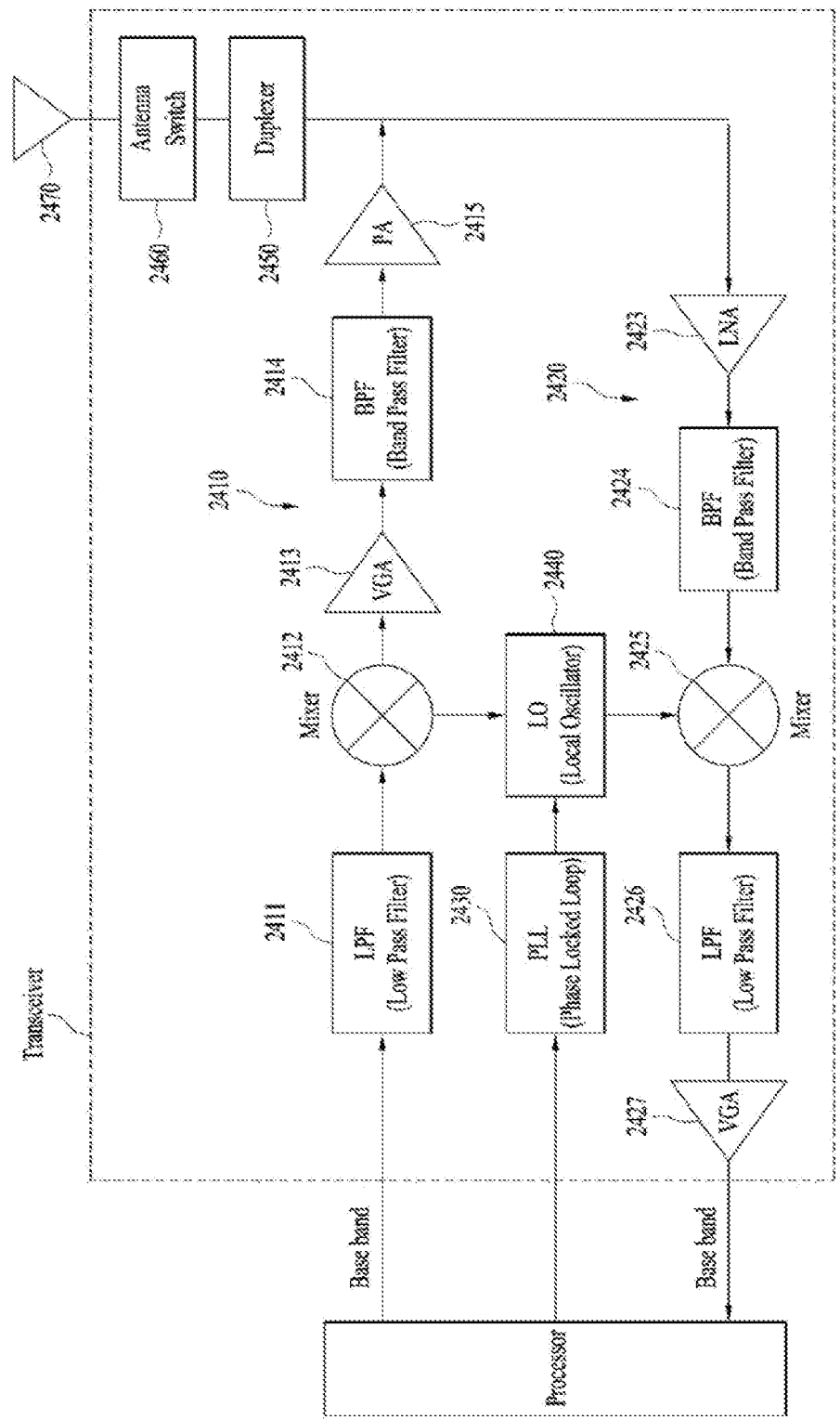
FIG. 21 shows an example of a transceiver of a wireless communication device.

FIG. 21 shows an example of a transceiver of a wireless communication device according to some implementations.

Particularly, FIG. 21 shows an example of a transceiver that may be implemented in Frequency Division Duplex (FDD) system.

In a transmit path, at least one processor, such as the processor described in FIGS. 19 and 20, may process data to be transmitted and may provide a signal, such as an analog output signal, to a transmitter 2410.

In this example, at the transmitter 2410, the analog output signal is filtered by a low pass filter (LPF) 2411, for example to remove artifacts caused by prior digital-to-analog conversion (ADC), is upconverted from baseband to RF by an upconverter (e.g., mixer) 2412, and is amplified by an amplifier such as a variable gain amplifier (VGA) 2413. The amplified signal is filtered by a filter 2414, further amplified by a power amplifier (PA) 2415, routed through duplexer(s) 2450/antenna switch(s) 2460, and transmitted via an antenna 2470.

In the receive path, an antenna 2470 receives signals from a wireless environment, and the received signals are routed through antenna switch(s) 2460/duplexer(s) 2450 and provided to the receiver 2420.

In this example, at the receiver 2420, the received signal is amplified by an amplifier such as a low noise amplifier (LNA) 2423, filtered by a band pass filter 2424, and downconverted from RF to baseband by a downconverter (e.g., mixer) 2425.

The downconverted signal is filtered by a low pass filter (LPF) 2426, and amplified by an amplifier such as a VGA 2427 to obtain an analog input signal, which is provided to at least one processor, such as the processor described in FIG. 19 and FIG. 20.

Further, a local oscillator (LO) generator 2440 generates and provides transmission and reception LO signals to the upconverter 2412 and downconverter 2425, respectively.

Implementations are not limited to the particular arrangement shown in FIG. 21, and various components and circuits may be arranged differently from the example shown in FIG. 21.

Figure 22:
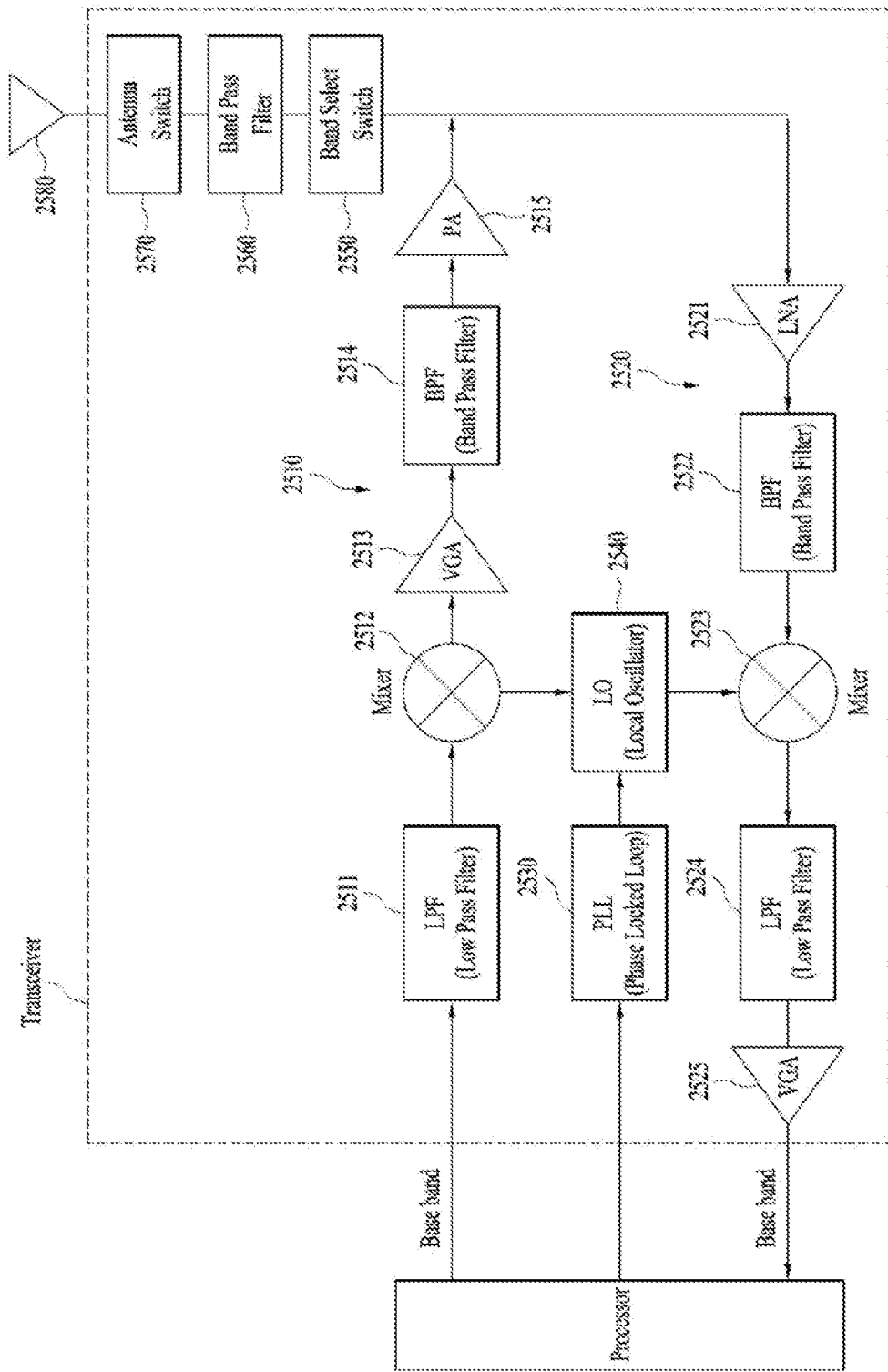
FIG. 22 shows another example of a transceiver of a wireless communication device.

FIG. 22 shows another example of a transceiver of a wireless communication device according to implementations of the present disclosure.

Particularly, FIG. 22 shows an example of a transceiver that may be implemented in a Time Division Duplex (TDD) system.

In some implementations, the transmitter 2510 and the receiver 2520 of the transceiver in the TDD system may have one or more similar features as the transmitter and the receiver of the transceiver in the FDD system. Hereinafter, the structure of the transceiver of the TDD system is described.

In the transmit path, a signal amplified by a power amplifier (PA) 2515 of a transmitter is routed through a band select switch 2550, a band pass filter (BPF) 2560, and an antenna switch(s) 2570, and transmitted via an antenna 2580.

In the receive path, the antenna 2580 receives signals from a wireless environment and the received signals are routed through the antenna switch(s) 2570, the band pass filter (BPF) 2560, and the band select switch 2550, and provided to the receiver 2520.

Figure 23:
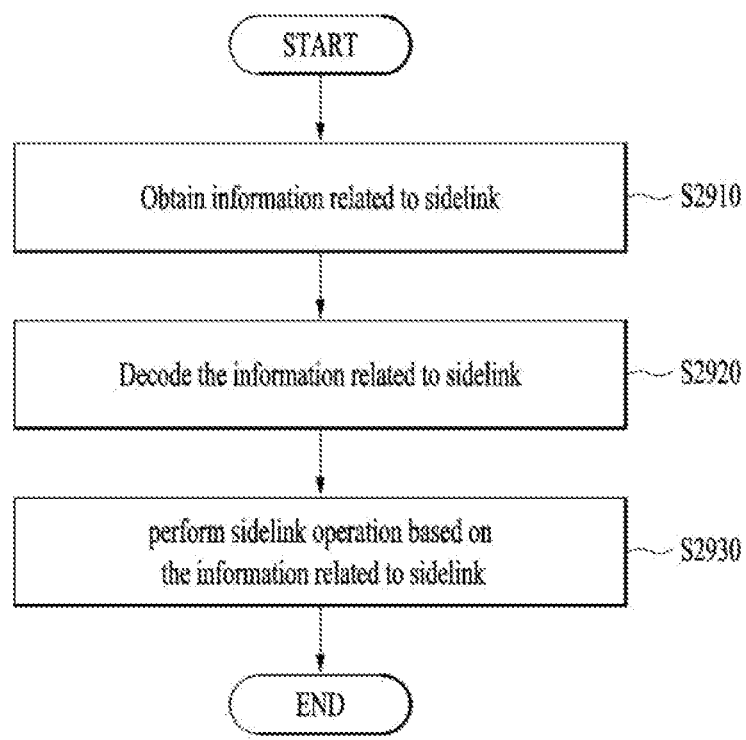
FIG. 23 shows an example of wireless device operation related to sidelink communication.

FIG. 23 shows an example of wireless device operation related to a sidelink.

Referring to FIG. 23, the wireless device obtains information related to a sidelink (S2910). The information related to the sidelink may be one or more resource configuration(s). The information related to the sidelink may be obtained from another wireless device or from a network node.

After obtaining the information, the wireless device decodes the information related to the sidelink (S2920).

After decoding the information related to the sidelink, the wireless device performs one or more sidelink operations based on the information related to the sidelink (S2930). Herein, the sidelink operation(s) performed by the wireless device may be one or more operations described herein.

The wireless device operation related to a sidelink disclosed in the FIG. 23 is merely an example, and sidelink operations using various techniques may be performed by the wireless device. A sidelink may be UE to UE interface for sidelink communication and/or sidelink discovery. A sidelink may correspond to the PC5 interface. In a broad sense, a sidelink operation may be transmission/reception of information between UEs.

Figure 24:
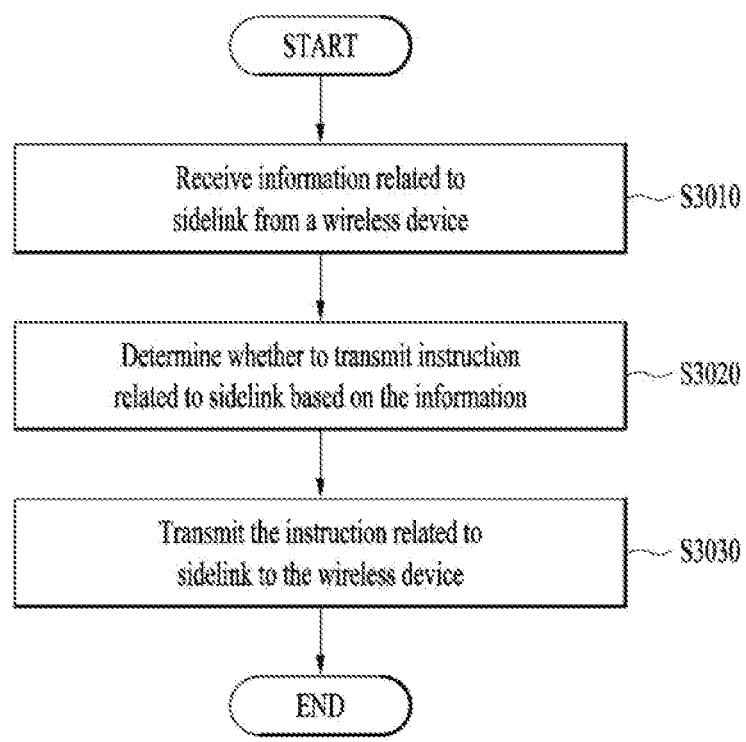
FIG. 24 shows an example of network node operation related to a sidelink.

FIG. 24 shows an example of network node operation related to a sidelink.

The network node operation related to the sidelink disclosed in the FIG. 24 is merely an example, and sidelink operations using various techniques may be performed by the network node.

The network node receives information related to a sidelink from a wireless device (S3010). For example, the information related to the sidelink may be 'SidelinkUEInformation' which is used for the indication of sidelink information to the network node.

After receiving the information, the network node determines whether to transmit one or more instructions related to the sidelink based on the received information (S3020).

Based on the network node determining to transmit the instruction(s), the network node transmits the instruction(s) related to the sidelink to the wireless device (S3030). In some implementations, after receiving the instruction transmitted by the network node, the wireless device may perform one or more sidelink operation(s) based on the received instruction.

Figure 25:
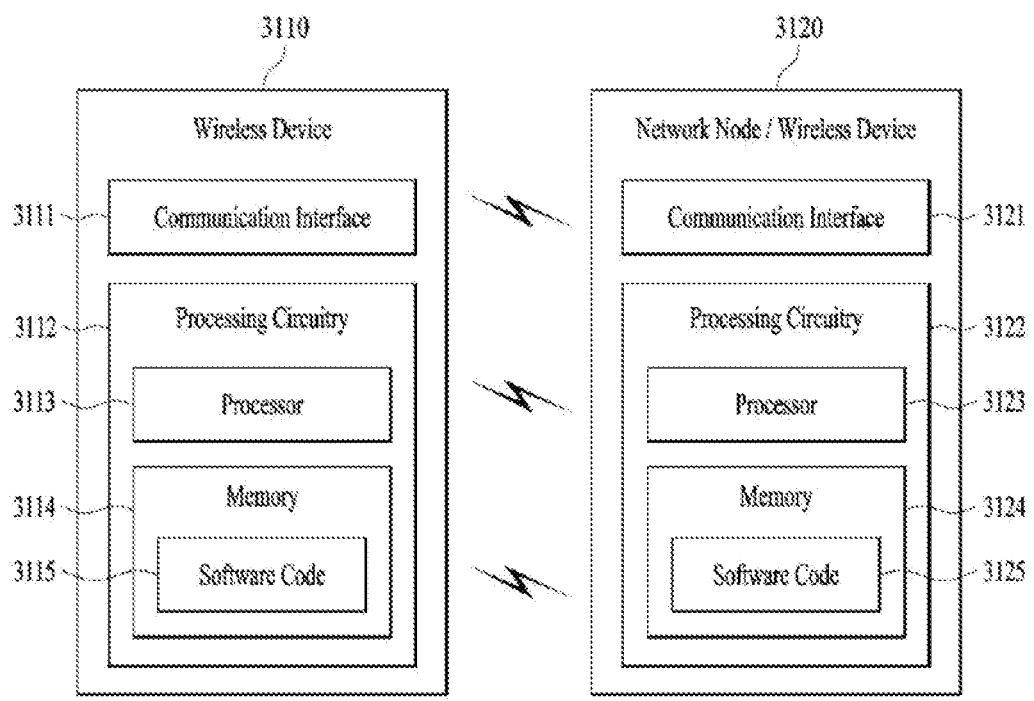
FIG. 25 is a block diagram illustrating an example of communications between a wireless device and a network node.

FIG. 25 is a block diagram illustrating an example of communications between a wireless device 3110 and a network node 3120. The network node 3120 may be replaced by a wireless device or a UE in FIG. 25.

In this example, the wireless device 3110 includes a communication interface 3111 for communicating with one or more other wireless devices, with network nodes, and/or with other elements in the network. The communication interface 3111 may include one or more transmitters, one or more receivers, and/or one or more communications interfaces. The wireless device 3110 includes a processing circuitry 3112. The processing circuitry 3112 may include at least one processor such as a processor 3113 and at least one memory device such as memory 3114.

The processing circuitry 3112 may be configured to control any of the methods and/or processes described herein and/or to cause such methods and/or processes to be performed, e.g., by the wireless device 3110. The processor 3113 corresponds to one or more processors for performing wireless device functions described herein. The wireless device 3110 includes a memory 3114 that is configured to store data, programmatic software code and/or other information described herein.

In one or more implementations, the memory 3114 is configured to store software code 3115 including instructions that, when executed by at least one processor such as a processor 3113, causes the processor 3113 to perform some or all of the processes discussed in detail with respect to FIG. 23 and implementations discussed herein.

For example, one or more processes involving transmission or reception of information may be performed by at least one processor, such as a processor 3113, controlling one or more transceivers, such as a transceiver 2223 in FIG. 20, to transmit or receive the information.

The network node 3120 includes a communication interface 3121 for communicating with one or more other network nodes, wireless devices, and/or other elements in network. Herein, the communication interface 3121 includes one or more transmitters, one or more receivers, and/or one or more communications interfaces. The network node 3120 includes a processing circuitry 3122. Herein, processing circuitry includes a processor 3123 and a memory 3124.

For example, one or more processes involving transmission or reception of information may be performed by at least one processor, such as a processor 3123, controlling one or more transceivers, such as a transceiver 2213 in FIG. 20, to transmit or receive the information.

The implementations of the present disclosure may be achieved by various techniques, for example, hardware, firmware, software, or a combination thereof.

In a hardware configuration, the methods according to the implementations of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the implementations of the present disclosure may be implemented in the form of a module, a procedure, a function, etc. Software code may be stored in the memory and executed by the processor. The memory may be located at the interior or exterior of the processor and may transmit data to and receive data from the processor via various known means.

As described above, the detailed description of the examples of the present disclosure has been given to enable those skilled in the art to implement and practice the disclosure. Although the disclosure has been described with reference to exemplary examples, those skilled in the art will appreciate that various modifications and variations can be made in the present disclosure without departing from the spirit or scope of the disclosure described in the appended claims. For example, those skilled in the art may use the constructions of the above-described embodiments in a combination manner. Accordingly, the disclosure should not be limited to the specific examples described herein, but should be accorded the broadest scope consistent with the principles and novel features disclosed herein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems

The invention claimed is:

1. A method of receiving a sidelink signal for each geographic region by a user equipment (UE) in a wireless communication system supporting sidelink, the method comprising:
receiving at least one synchronization signal transmitted in each geographic region; and
receiving the sidelink signal by configuring a reception timing for the sidelink signal for each geographic region based on the at least one synchronization signal,
wherein the sidelink signal is received in a time division multiplexed resource region for the each geographic region, and
wherein, based on overlap of a partial region between time division multiplexed resource regions, the UE demodulates the received sidelink signal by puncturing a resource element or a symbol mapped to the overlapping partial region from the received sidelink signal.

2. The method of claim 1,
wherein the reception timing is determined based on a reception timing of a synchronization signal for the each geographic region in which the sidelink signal is transmitted.

3. The method of claim 1,
wherein the reception timing is changed according to the each geographic region in which the sidelink signal is transmitted.

4. The method of claim 1,
wherein the reception timing is differently configured according to the each geographic region.

5. The method of claim 1,
wherein the synchronization signal is received a time division multiplexed synchronization resource region for the each geographic region.

6. The method of claim 1,
wherein, based on overlap of a partial region between the time division multiplexed resource regions according to the geographic region, the sidelink signal is transmitted by puncturing or rate-matching a resource element or a symbol mapped to the partial region.

7. The method of claim 1,
wherein a size of the geographic region is determined based on at least one of a subcarrier spacing, a carrier frequency, or coverage of the UE.

8. The method of claim 1,
wherein the number of geographic regions is determined based on at least one of a cyclic prefix (CP) length, a subcarrier spacing, a carrier frequency, or coverage of the UE.

9. The method of claim 1,
wherein information for the time division multiplexed resource regions is signaled by a network to the UE through a physical layer or higher layer signal.

10. The method of claim 1, further comprising:
determining a first synchronization resource region related to geographic information of the UE among time division multiplexed synchronization resource regions for the each geographic region; and
transmitting the synchronization signal in the determined first synchronization resource region.

11. The method of claim 10,
wherein, based on a change of the synchronization resource region related to the geographic information for the UE to a second synchronization resource region, the UE transmits a new synchronization signal in the changed the second synchronization resource region.

12. The method of claim 10,
wherein the time division multiplexed synchronization resource regions include a preconfigured time gap.

13. An apparatus for configuring a reception timing of a sidelink signal for each geographic region in a wireless communication system supporting sidelink, the apparatus comprising:
a processor; and
a memory connected to the processor,
wherein the processor receives information on at least one synchronization signal transmitted in each geographic region from the memory, and configures a timing at which the sidelink signal is to be received in the geographic region based on the received at least one synchronization signal,
wherein the sidelink signal is received in a time division multiplexed resource region for the each geographic region, and
wherein, based on overlap of a partial region between time division multiplexed resource regions, the UE demodulates the received sidelink signal by puncturing a resource element or a symbol mapped to the overlapping partial region from the received sidelink signal.

* * * * *